Patented Feb. 22, 1927.

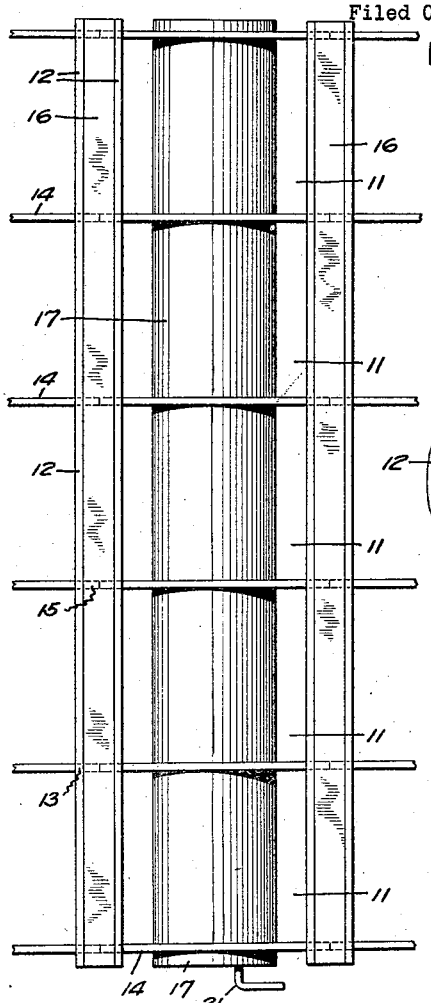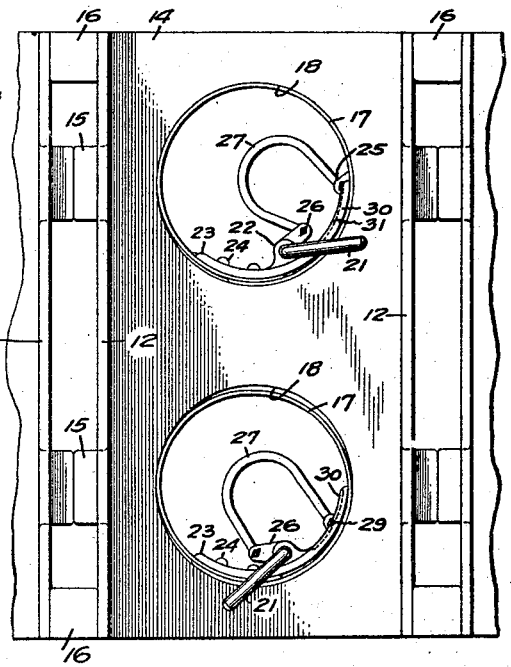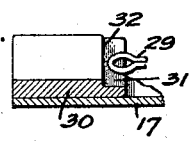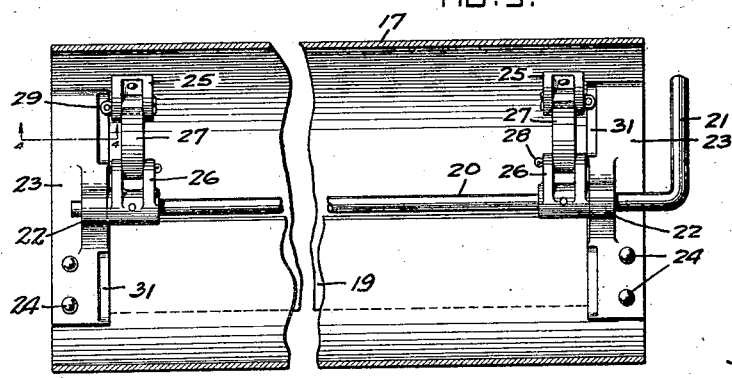

1,618,647

UNITED STATES PATENT OFFICE.

STEPHEN FLAM, OF WALNUT PARK, CALIFORNIA, ASSIGNOR TO SUPERTILE MACHINERY CORPORATION, OF LOS ANGELES, CALIFORNIA, A CORPORATION OF CALIFORNIA.

MOLD CORE.

Application filed October 8, 1923. Serial No. 667,243.

This invention relates to a mold for forming articles from plastic material, and more particularly to a core construction for use in concrete or cement molds for building materials or for pipes. In case blocks are cast, such cores are necessary to secure the requisite degree of lightness and saving in material; while in pipe molds, cores of course serve to define the inner surface of the pipes.

In order to permit the cores to be readily assembled in the molds for pouring, and to withdraw them after the casting is set, these cores are often made collapsible. It is one of the objects of my invention to provide such a core that may readily be expanded and collapsed, when assembling and dismantling the mold.

In multiple molds for casting building blocks, such as disclosed in my copending application, Serial No. 583,738, filed August 23rd, 1922, and entitled Mold for casting blocks, such cores are efficiently utilized by extending them through several compartments of the mold, each compartment forming a block mold. These compartments may be formed by the aid of strips of sheet metal or the like, through which the cores extend. In the past, such cores were held in place by the aid of wedges or the like which serve to expand the mold, whereby they were tightened within the apertures in the strips. Such process of assembling is tedious, and it is another object of my invention to provide a core in which the necessity of driving wedges is entirely obviated, and instead a single movement is all that is necessary to expand or to contract the core.

Still another object of my invention is to provide a core construction such that it compensates automatically for any slight irregularity in the mold, as for example where the plates through which the cores pass and which form the mold compartments, are not accurately alined behind one another, or are twisted from their original form. Such irregularities may be occasioned, and are often caused, by the hard usage that the molds receive. Without some form of compensating device, it may be impossible to insert and expand the core, and it is this condition that I aim to correct.

Further objects of my invention reside in certain combinations of mechanical elements, which are described in the following description, and pointed out with particularity in the appended claims. The invention itself is exemplified in a single embodiment as applied to a block or tile mold illustrated in the acompanying drawings. It is to be understood however that I do not desire to be limited to this embodiment, since the invention as expressed in the claims may be embodied in other forms also.

Referring to the drawing:

Figure 1 is a top plan view of a portion of a block or tile mold utilizing my invention;

Fig. 2 is a front elevation of the portion of the mold shown in Fig. 1, and illustrating two cores in place, one expanded and the other collapsed;

Fig. 3 is a longitudinal sectional view of a core embodying my invention; and

Fig. 4 is detail sectional view along plane 4—4 of Fig. 3.

In the present instance I illustrate a multiple block mold, having a plurality of rows, one only of which is shown complete in Fig. 1, each row in turn being subdivided into rectangular mold compartments 11. Such construction is especially adapted for concrete block molding. Each row is formed by a pair of longitudinally extending plates 12 (Figs. 1 and 2); these plates may be appropriately formed with slots 13. The separating plates 14 are correspondingly formed with the flaps or projections 15 which extend into the slots 13. This manner of forming the rectangular mold compartments is illustrated by way of example only, since obviously other types of construction may be used to produce substantially the same results.

A plurality of rows form a complete collapsible mold assembly, which may readily be assembled and dismantled in an obvious manner. Adjacent rows in the present instance are separated by a small space, by the aid of the spacer strips 16. These may be of wood or the like, and fastened preferably to one only of the longitudinal strips 12. In any appropriate manner, the rows of molds are held tightly together; and furthermore the entire assembly rests on a plane surface that forms the bottom of the mold. After the mold has been filled and the blocks set sufficiently, all of the plates 12 and 14 may be separated, and later set up for use again.

In order to economize in material and also to make the finished product as light as practicable, it is common to provide one or more cores 17 which serve to form apertures in the product. To accommodate these cores, the plates 14 are provided with preferably two apertures 18, through which the cores may extend. Each of the cores preferably extends through all of the plates 14 in a longitudinal row, as clearly shown in Fig. 1. The cores 17 in the present instance are substantially circular in cross section, and formed by overlapping the edges of a continuous strip of resilient sheet metal. This overlapping is shown most clearly at 19 on Fig. 3. The material in the cores is so arranged that when no force is exerted thereon, the core assumes the collapsed position as shown by the bottom core 17 of Fig. 2; in this condition, its external diameter is somewhat less than that of the apertures 18 in plates 14, whereby the cores may be readily inserted or removed from these plates. In its active position, however, the core 17 is expanded, as shown by the top core 17 of Fig. 2. This expansion is allowed for by the overlapping portion 19. In this condition the core 17 engages tightly against the inner walls of apertures 18.

One of the important features of my invention resides in the ease with which the contraction and expansion of core 17 may be accomplished. For this purpose all that is necessary is to rotate a rod 20 as by the aid of the handle 21 which is formed by bending the end of the rod 20.

In order that rotation of rod 20 may effect this result, this rod is pivoted near one edge of the overlapped part 19 of core 17, as in the bearings 22 shown most clearly in Fig. 3. These bearings are located near the ends of the core, and inside thereof. The bearings 17 may conveniently be formed integrally with the curved base 23 which extends over the overlapped portion 19, and is fastened as by rivets 24 to the inside of core 17, and to the inside edge only of the overlapped portion 19. To the other edge are fastened the bearings 25. Now in order to permit the expansion and contraction of the core 17, it is merely necessary to provide a mechanical connection between the rod or shaft 20 and the members 25. This is accomplished by a crank or link connection which in this instance includes the cranks 26 and the links 27. The cranks 26 are shown as fastened to the rod 20 (Fig. 3) on the inside of the bearing members 22, and are pivoted to one end of the links 27, as by the aid of the cotters 28. The other end of each of the links is pivoted to its respective bearing 25, as by the aid of the cotters 29. The links 27 are arched as shown, so as to permit the free movement of crank 26 between the two positions shown in Fig. 2. In the upper portion of the figure, the mechanism being in the core expanding position, the crank 26 falls outside of the arch formed by link 27; while in the lower contracting portion of this figure, the link 27 encompasses the crank; and rod 20 also falls under the arch. This change in relative position is accomplished by appropriate movement of handle 21.

In the expanded position of core 17 a force due to the resilience of the core is transmitted through link 27 and urges crank 26 to a locking position. In order to permit the core to go to the collapsed position shown at the bottom of Fig. 2, it is necessary to rotate handle 21 in a counterclockwise direction by a slight amount over center; at least far enough so that the resilience of the core will tend to carry it further in the same direction. In this way there is an assurance that the core cannot accidentally collapse. This "over-center" feature is of great importance, in which the springiness of the core cooperates with a pair of pivoted elements 26 and 27, which form for this purpose virtually a toggle connection between two points on the core that are near the overlapping edge and which therefore move substantially relative to each other when the size of the core is varied.

Although a rigid link 27 may be advantageously used, I prefer to make it of such resilience that it can give a little. The bowed shape of this element assists in providing this effect. Due to this resilience, any slight misalinement or other irregularity due to rough usage is readily compensated for and is taken up by it. Thus this feature is of considerable importance due to the severe handling usually accorded this type of apparatus, and in fact without it, the core might in a short time become incapable of use.

It is evident that without some guiding device, there would be no assurance of causing the expansion and contraction to take place uniformly and without distortion of the core. With my construction this guide is very readily supplied. For this purpose both of the castings 23 are extended as at 30 to form a tongue. One edge of this tongue 30 is adapted to enter between the pin 29 for link 27, and the core metal itself, as clearly indicated in Figs. 2 and 4. This edge is properly shouldered as at 31, (Fig. 4) so as to provide for a track upon which the head of cotter pin 29 travels. The vertical wall 32 of the shoulder also helps to prevent the withdrawal of the pin. It is evident that with this construction, the expansion and contraction of core 17 must take place in such a way as to permit the tongue 30, fastened to one edge of the core, to slide in a space defined by stationary elements associated with the other edge. Of course other varieties of such a construction could be designed, but it is considered unnecessary to detail these here.

The mode of operation of the entire core is evidently clear from the foregoing description. To insert the core in the mold apertures, it must be in the collapsed position; then by turning handle 21 in a clockwise direction for about a half-turn, the core 17 is expanded and is caused to fill the apertures 18 snugly. After the plastic material is poured and set sufficiently, the reverse process is used to free the core from the mold.

Although a block mold is disclosed in the present application, it is of course possible to utilize the invention in connection with all other kinds of cored molds, such as pipe or conduit molds.

I claim:

1. In a collapsible core, a tubular body capable to being expanded or contracted, and means for expanding or contracting the body, comprising a pair of pivotally connected elements operating at their unconnected extremities to vary the size of the body, one of said elements being resilient as as regards its length.

2. The combination as set forth in claim 1, characterized by the fact that the resilient element is a bow spring.

3. In a collapsible core, a tubular body formed of a single piece of resilient material with adjacent unconnected edges, and means for altering the size of the body, comprising a toggle link mechanism connecting the interior of the core at two places located respectively near the opposed edges, one of the links of the toggle being resilient as regards its length.

4. In a collapsible core, a tubular body formed of a single piece of resilient material with adjacent unconnected edges, and means for altering the size of the body, comprising a rotatable rod extending within the body for substantially the full length thereof, means for pivotally supporting it within the body near one of the edges, a pair of cranks fastened to the rod near the extremities of the body, and bowed resilient links pivoted to the cranks and also to the core body near that edge which is not in direct mechanical connection with the rod.

5. In a collapsible core, a tubular core body formed of a single piece of resilient material and having adjacent unconnected edges, and means for altering the size of the body, comprising a pair of pivoted elements forming a link mechanism and pivoted at their free extremities near the adjacent edge, and capable when extended of expanding the core, a bearing support for one of the links, and an extension on said support and adjacent the inner surface of the core body, said extension adapted to telescope, as the size of the core is varied, between the inner surface of the core and a part of the link mechanism.

In testimony whereof, I have hereunto set my hand.

STEPHEN FLAM.